United States Patent
Bisson et al.

(10) Patent No.: US 10,245,540 B2
(45) Date of Patent: Apr. 2, 2019

(54) INERTIAL PARTICLE SEPARATOR FOR ENGINE INLET

(71) Applicant: PRATT & WHITNEY CANADA CORP., Longueuil (CA)

(72) Inventors: Francois Bisson, Vallée-Jonction (CA); Mark Cunningham, Montreal-West (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 101 days.

(21) Appl. No.: 15/401,237

(22) Filed: Jan. 9, 2017

(65) Prior Publication Data
US 2018/0193782 A1    Jul. 12, 2018

(51) Int. Cl.
*B01D 45/06* (2006.01)
*B64D 33/02* (2006.01)
*F02C 7/052* (2006.01)

(52) U.S. Cl.
CPC .............. *B01D 45/06* (2013.01); *F02C 7/052* (2013.01); *B64D 2033/0246* (2013.01); *F05D 2260/607* (2013.01)

(58) Field of Classification Search
CPC ........ B01D 33/02; B01D 45/04; B01D 45/00; B01D 45/12; B01D 45/16; B01D 50/00; F02C 7/05; F02C 7/052; F02C 7/055
USPC .......................................... 55/306; 244/53 B
See application file for complete search history.

(56) References Cited

U.S. PATENT DOCUMENTS

| 2,835,342 | A |  | 5/1958 | Hockert |  |
| 3,329,377 | A |  | 7/1967 | Peterson et al. |  |
| 3,952,972 | A | * | 4/1976 | Tedstone | B64D 33/02 244/53 B |
| 4,300,918 | A |  | 11/1981 | Cary |  |
| 4,346,860 | A | * | 8/1982 | Tedstone | F02C 7/05 244/53 B |
| 4,844,382 | A | * | 7/1989 | Raisbeck | B64D 33/02 244/53 B |

(Continued)

FOREIGN PATENT DOCUMENTS

EP    1942258 A2    7/2008

OTHER PUBLICATIONS

European Search Report received in counterpart application No. 18150901.9 dated May 7, 2018.

*Primary Examiner* — Duane Smith
*Assistant Examiner* — Minh Chau T Pham
(74) *Attorney, Agent, or Firm* — Norton Rose Fulbright Canada LLP

(57) ABSTRACT

An inertial particle separator for an aircraft engine inlet, including inlet, intermediate and bypass ducts. The intermediate duct extends generally transversally from the inlet duct to the engine inlet, and communicates with the inlet duct adjacent its downstream end. The bypass duct extends downstream from the inlet duct and intermediate duct, and defines an outlet communicating with the environment of the engine. A wall of the intermediate duct intersects a wall of the inlet duct on an engine side of the wall of the inlet duct. The engine side of the wall of the inlet duct defines an engine-side inlet air flow line of the inertial particle separator. A wall of the bypass duct intersects the wall of the intermediate duct closer to a central axis of the engine than an extension of the engine-side inlet air flow line into the bypass duct.

18 Claims, 5 Drawing Sheets

(56) References Cited

U.S. PATENT DOCUMENTS

| | | | |
|---|---|---|---|
| 5,039,317 A | 8/1991 | Thompson et al. | |
| 5,653,880 A | 8/1997 | Mouton | |
| 6,698,180 B2 | 3/2004 | Snyder | |
| 7,091,470 B2 | 8/2006 | Horikawa et al. | |
| 7,296,395 B1 * | 11/2007 | Hartman | B01D 45/04 244/53 B |
| 7,658,061 B2 * | 2/2010 | Kawamoto | F02C 7/05 55/306 |
| 7,850,934 B2 | 12/2010 | Doring | |
| 7,854,778 B2 | 12/2010 | Groom et al. | |
| 8,512,450 B2 | 8/2013 | Kazlauskas et al. | |
| 8,663,350 B2 | 3/2014 | Snyder | |
| 9,046,056 B2 | 6/2015 | Lerg | |
| 9,114,347 B2 | 8/2015 | Eyers et al. | |
| 9,314,723 B2 * | 4/2016 | Judd | B01D 45/04 |
| 9,731,831 B2 * | 8/2017 | Mores | B64D 33/02 |
| 9,889,945 B2 * | 2/2018 | Judas | B64D 33/02 |
| 2016/0265435 A1 | 9/2016 | Snyder | |
| 2017/0211475 A1 | 7/2017 | Mayer et al. | |
| 2018/0347464 A1 | 12/2018 | Judd et al. | |

\* cited by examiner

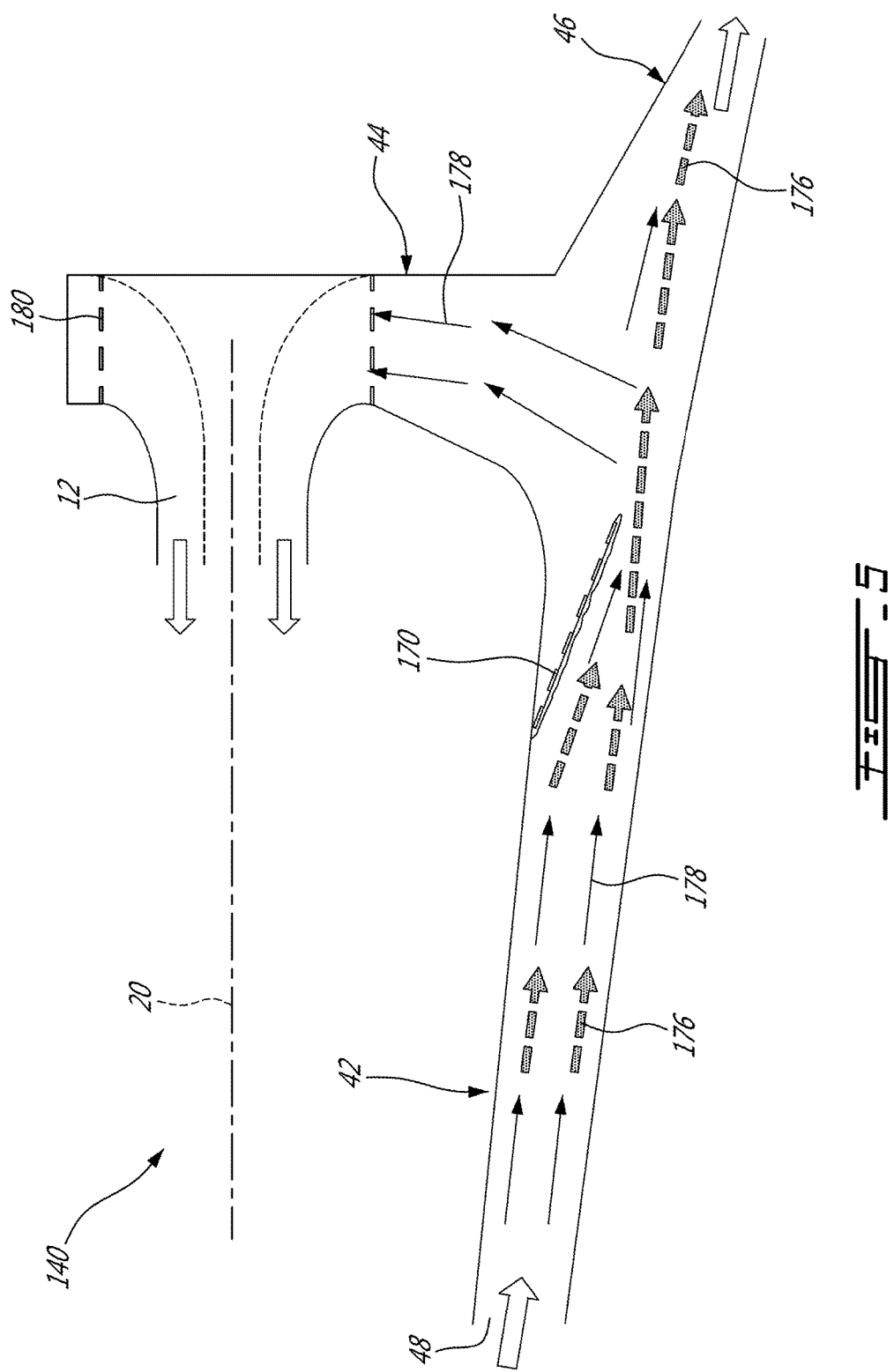

INERTIAL PARTICLE SEPARATOR FOR ENGINE INLET

TECHNICAL FIELD

The application relates generally to aircraft engine inlets and, more particularly, to particle separation at such inlets.

BACKGROUND OF THE ART

Aircraft engines such as gas turbine engines may be susceptible to increase wear and/or failures when some types of particles are ingested in the engine inlets. Intake assemblies of turboshaft and turboprop engines typically include a particle separator to minimize ingestion of particles in the engine inlet.

Some particle separators rely on solid vanes and/or multiple curves or turns between the inlet duct and the bypass duct to create obstructions to the flow allowing the particles to drop out of the airflow before the flow reaches the engine inlet. However, obstructions to the flow create pressure losses and/or flow distortions which are detrimental to engine performances.

SUMMARY

In one aspect, there is provided an aircraft engine having an inertial particle separator communicating with an engine inlet of the aircraft engine, the inertial particle separator comprising: an inlet duct defining an intake communicating with an environment of the engine; an intermediate duct extending generally transversally from the inlet duct to the engine inlet, the intermediate duct communicating with the inlet duct adjacent a downstream end of the inlet duct; and a bypass duct in fluid communication with and extending downstream from the inlet duct and intermediate duct, the bypass duct defining an outlet communicating with the environment of the engine; wherein a wall of the intermediate duct intersects a wall of the inlet duct on an engine side of the wall of the inlet duct, the engine side of the wall of the inlet duct defining an engine-side inlet air flow line of the inertial particle separator, a wall of the bypass duct intersecting the wall of the intermediate duct closer to a central axis of the engine than an extension of the engine-side inlet air flow line into the bypass duct.

In another aspect, there is provided a gas turbine engine comprising: at least one rotatable shaft in driving engagement with a compressor section and with a turbine section and defining a central axis of the engine; an engine inlet in fluid communication with the compressor section; an inertial particle separator comprising: an inlet duct defining an intake and including a wall having opposed engine and outer sides, the engine side located between the central axis of the engine and the outer side; an intermediate duct extending radially inwardly from the inlet duct to the engine inlet, the intermediate duct communicating with the inlet duct adjacent a downstream end of the inlet duct, a wall of the intermediate duct intersecting the wall of the inlet duct on the engine side; and a bypass duct in fluid communication with and extending downstream from the inlet duct and intermediate duct to define an outlet; wherein in a plane containing central axes of the inlet duct and of the bypass duct, an imaginary straight line overlaps the engine side of the wall of the inlet duct and extends downstream from the inlet duct into the bypass duct; and wherein an intersection between a wall of the bypass duct and the wall of the intermediate duct is located radially inwardly of the imaginary straight line.

In a further aspect, there is provided a method of separating particles from a flow for an inlet of an engine, the method comprising: directing a first portion of the flow including air and particles through an inlet duct and into a bypass duct away from the inlet of the engine without impacting a wall of an intermediate duct, the intermediate duct extending generally transversally from the inlet duct to the inlet of the engine; and directing a second portion of the flow including air through the inlet duct and turning the second portion of the flow away from the first portion and into the intermediate duct to flow the second portion to the inlet of the engine.

DESCRIPTION OF THE DRAWINGS

Reference is now made to the accompanying figures in which:

FIG. 5 is a schematic cross-sectional view of the inertial particle separator of FIG. 3 during icing conditions.

DETAILED DESCRIPTION

Figure 1:
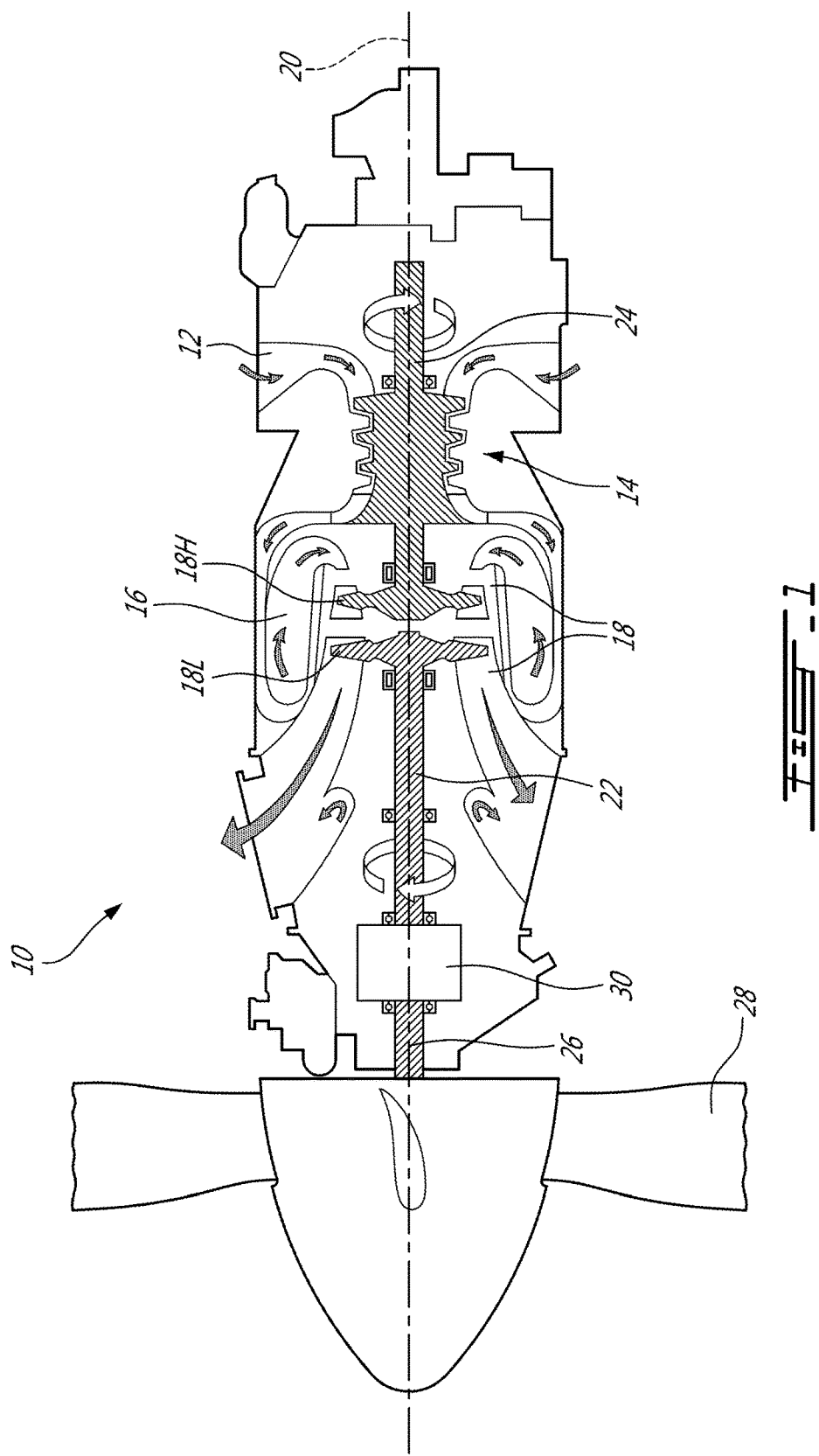
FIG. 1 is a schematic cross-sectional view of a gas turbine engine.

FIG. 1 illustrates a gas turbine engine 10 of a type preferably provided for use in subsonic flight, generally comprising in serial flow communication an engine inlet 12 through which ambient air is received, a compressor section 14 for pressurizing the air, a combustor 16 in which the compressed air is mixed with fuel and ignited for generating an annular stream of hot combustion gases, and a turbine section 18 for extracting energy from the combustion gases.

The engine 10 includes at least one rotatable shaft defining a central axis 20 of the engine. In the embodiment shown, two co-axial and independently rotatable shafts are provided: a low pressure or power shaft 22, and a high pressure shaft 24. The high pressure shaft 24 is driven by a high pressure portion 18H of the turbine section 18, and drives the compressor section 14. The low pressure shaft 22 is driven by a low pressure portion 18L of the turbine section 18 which is located downstream of the high pressure portion 18H, and drives an output shaft 26 engaged to a propeller 28; the output shaft 26 is driven through a reduction gearbox 30.

Although the engine 10 is shown as a turboprop engine, it is understood that the engine 10 may have any suitable alternate configuration, including, but not limited to, a turboshaft configuration. Moreover, although the engine 10 is shown as a gas turbine engine, it is understood that the engine may have any other suitable configuration.

Figures 2A, 2B:
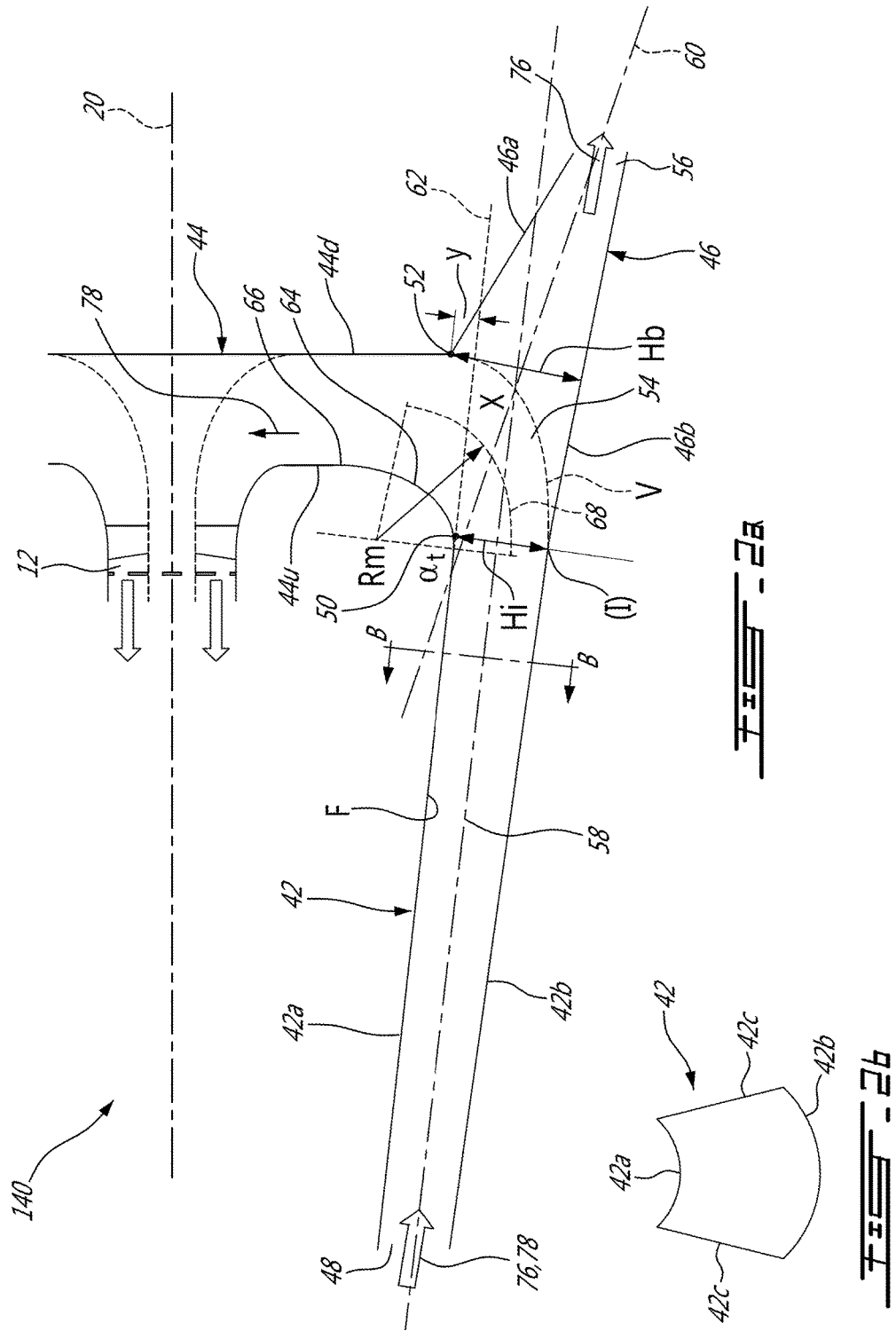
FIG. 2a is a schematic cross-sectional view of an inertial particle separator in accordance with a particular embodiment, which may be used with the gas turbine engine of FIG. 1.
FIG. 2b is a schematic cross-sectional view of an inlet duct of the inertial particle separator of FIG. 2a, taken along line B-B.

Referring to FIGS. 2a-2b, an inertial particle separator 40 in accordance with a particular embodiment is shown, configured for communicating with the engine inlet 12. The particle separator 40 generally includes an inlet duct 42, an intermediate duct 44, and a bypass duct 46.

The inlet duct 42 defines an intake 48 communicating with the environment of the engine 10. The inlet duct 42 has a wall having an engine side 42a and an outer side 42b radially spaced from one another, with the outer side 42b being located radially outwardly of the engine side 42a with respect to the central axis 20 of the engine 10, i.e. the engine side 42a is located between the central axis 20 of the engine 10 and the outer side 42b. In a particular embodiment and as can be seen in FIG. 2b, the inlet duct 42 has an arcuate cross-section, and the engine and outer sides 42a, 42b are each defined by wall portions having a concave cross-sectional shape with the concavity being oriented radially inwardly. Opposed wall portions 42c extend between the engine and outer sides 42a, 42b of the wall. Other configurations may be possible. For example, the inlet duct 42 may have a circular or oval cross-section, in which case the engine and outer sides 42a, 42b of the wall may be connected to each other in a continuous manner.

Referring back to FIG. 2a, the intermediate duct 44 is in fluid communication with the inlet duct 42 adjacent its downstream end. The intermediate duct 44 extends radially inwardly, generally transversally to the inlet duct 42, and is connected to the engine inlet 12. The intermediate duct 44 has a wall with axially spaced apart upstream and downstream wall portions 44u, 44d. The wall of the intermediate duct 44, more particularly the upstream wall portion 44a, intersects the wall of the inlet duct 42 on the engine side 42a at a first intersection 50. In the embodiment shown and as will be further detailed below, the engine side 42a of the wall of the inlet duct 42 is straight along its longitudinal direction, and the upstream wall portion 44u is curved at the intersection with the engine side 42a of the inlet duct wall; accordingly the first intersection 50 is defined at the beginning of the curved wall.

It the present specification, including claims, the terms "intersection" and related terms (e.g. "intersects") are intended to encompass the point of attachment of walls manufactured separately and attached together through any suitable type of attachment, as well a point of transition (e.g., change of direction) between adjacent portions of a monolithic wall.

Still referring to FIG. 2a, the bypass duct 46 is in fluid communication with the inlet duct 42 and intermediate duct 44, and extends downstream from the inlet duct 42 and from the intermediate duct 44. The bypass duct 46 has a wall having an outer side 46b extending from a downstream end of the outer side 42b of the wall of the inlet duct 42. The wall of the bypass duct 46 also has an engine side 46a intersecting the wall of the intermediate duct 44, more particularly the downstream wall portion 44d, at a second intersection 52. The inlet duct 42, intermediate duct 44 and bypass duct 46 thus communicate with each other at 54, and together define an "inverted T" shape. The bypass duct 46 defines an outlet 56 communicating with the environment of the engine. In a particular embodiment, the inertial particle separator 40 defines a bypass ratio of at least 2%; in a particular embodiment, the bypass ratio is at least 5%. Other values are possible, including values greater than 0. The bypass ratio can for example be provided passively by the pressure difference across the duct, or via a blower or ejector system (not shown).

The bypass duct 46 is in general alignment with the inlet duct 42. For example, in the embodiment shown, a central axis 58 of the inlet duct 42 extends from the inlet duct 42 into the bypass duct 46 before intersecting the wall 46a, 46b of the bypass duct 46. Also, in the embodiment shown, the central axis 58 of the inlet duct 42 does not extend through the outer side 46b of the wall of the bypass duct 46, and extends through the engine side 46a of the wall of the bypass duct 46 only after penetrating the bypass duct 46, i.e. the interior surface of the engine side 46a of the wall of the bypass duct 46 is located between the inlet duct 42 and the outer surface of the engine side 46a of the wall of the bypass duct 46 along the central axis 58 of the inlet duct 42.

It can be seen in FIG. 2a that the engine side 42a of the wall of the inlet duct 42 defines an engine-side inlet air flow line F of the inertial particle separator. The wall of the bypass duct 46 intersects the wall of the intermediate duct 44 closer to the engine than an extension 62 of the engine-side inlet air flow line F into the bypass duct 46, i.e. the intersection 52 between the engine side 46a of the bypass duct wall and downstream wall portion 44d is located closer to the central axis 20 of the engine than the extension 62 of the engine-side inlet air flow line into the bypass duct 46. The intersection 52 between the engine side 46a of the wall of the bypass duct 46 and the wall of the intermediate duct 44 is thus located radially inwardly of the extension 62 of the engine-side inlet air flow line into the bypass duct 46.

In the embodiment shown, the engine-side inlet air flow line and its extension can be drawn as an imaginary straight line 62 defining a prolongation of the engine side 42a of the wall of the inlet duct 42 in a plane containing the central axis 58 of the inlet duct 42 and a central axis 60 of the bypass duct 46 (i.e., the plane of FIG. 2a). The imaginary straight line 62 overlaps the engine side 42a of the wall of the inlet duct 42 adjacent the first intersection 50, and extends downstream from the inlet duct 42 into the bypass duct 46. The intersection 52 between the walls of the intermediate duct 44 and of the bypass duct 46 is located radially inwardly of this imaginary straight line 62, i.e. the second intersection 52 is located radially inwardly of a prolongation of the engine side 42a of the wall of the inlet duct 42. In the embodiment shown, the intersection 52 between the walls of the intermediate duct 44 and of the bypass duct 46, and the outer side 46b of the wall of the bypass duct 46, are located on opposed sides of the imaginary straight line 62.

The second intersection 52 is located radially inwardly of the extension 62 of the engine-side inlet air flow line (imaginary straight line 62 defining the prolongation of the engine side 42a of the wall of the inlet duct 42) by a radial distance y. In a particular embodiment, the flow directed in the inlet duct 42 (which may include particles) flows into the bypass duct 46 without impacting the downstream wall portion 44d of the intermediate duct, since the engine side 42a of the wall of the inlet duct 42 directs the flow radially outwardly of the outward-most portion of the downstream wall portion 44d (i.e., of the second intersection 52). In a particular embodiment, the second intersection 52 is located radially inwardly of the prolongation of the engine side 42a of the wall of the inlet duct 42 a sufficient distance to provide adequate particle separation without the need to add an obstruction to the flow, e.g. to prevent the particles from hitting the downstream wall portion 44d and being turned with the air flow circulating from the inlet duct 42 into the intermediate duct 44.

In the embodiment shown, the upstream wall portion 44d of the intermediate duct 44 has a curved portion 64 extending from the inlet duct 42 (i.e. from the first intersection 50) and a straight portion 66 extending from the curved portion 64. The curved portion 64 thus defined a curved transition between the intermediate duct 44 and the inlet duct 42. The curved transition can be represented by a curved central axis 68, which is defined as a mean curve corresponding to the average (i.e. mid-span) between the curved portion 64 and a virtual curve V smoothly connecting the outer side 42b of the wall of the inlet duct and the downstream wall portion 44d of the intermediate duct 44. In a particular embodiment, the particle separator is configured so as to correspond to $$\frac{y}{R_m} > A(\sin(\alpha_t) - 1)$$

where y is the radial distance between the imaginary straight line 62 (extension of the engine-side inlet air flow line) and the intersection 52 between the walls of the intermediate and bypass ducts 44, 46, $R_m$ is a mean radius of the central axis 68 of the transition between the intermediate duct 44 and the inlet duct 42, $\alpha_t$ is the angle defined between the first intersection 50 and the straight portion 66 of the upstream wall 44u, i.e. the bend angle defined by the curved portion 64, and A is a constant greater than 0. In a particular embodiment, A has a value within a range extending from 0.2 to 5.

In the embodiment shown, the inlet duct 42 and the bypass duct 46 each have a straight central axis 58, 60, with the two axes 58, 60 extending slightly angled from each other. The walls 42a, 42b, 46a, 46b of the inlet duct 42 and of the bypass duct 46 also extend in a straight manner along their longitudinal direction, i.e. they appear as straight lines in the plane of FIG. 2a. Other configurations are also possible. For example, one or both of the central axes 58, 60 may be curved.

A height $H_i$ of the inlet duct 42 can be defined at the first intersection 50, and a height $H_b$ of the bypass duct 46 can be defined at the second intersection 52. In the embodiment shown, the outer sides 42b, 46b of the walls of the inlet duct 42 and of the bypass duct 46 extend non-parallel to each other but are only slightly angled with respect to each other, and the height $H_b$ of the bypass duct 46 is greater than the height $H_i$ of the inlet duct 42. In a particular embodiment, the height $H_i$ of the inlet duct 42 is approximately 6 inches; other values may alternately be used.

A width X of an inlet of the intermediate duct 44 can be defined between the first and second intersections 50, 52, i.e. from the intersection 50 between the walls of the inlet and intermediate ducts 42, 44 to the intersection 52 between the walls of the intermediate and bypass ducts 44, 46, along the imaginary straight line 62 of the prolongation of the engine side 42a of the wall of the inlet duct 42 (extension of the engine-side inlet air flow line). In a particular embodiment, the particle separator is configured so as to correspond to $$\frac{M_1^{0.6}}{X} * H_i > B$$

where X is the width of the inlet of the intermediate duct 44, $M_1$ is the Mach number of the airflow at a particular engine operating condition at the intersection between the outer walls 42b, 46b of the inlet duct 42 and of the bypass duct 46, e.g. at the slight bend indicated at (1) in FIG. 2a, $H_i$ is the height of the inlet duct 42 and B is a constant. In a particular embodiment, B has a value within a range extending from 0.12 to 0.5. In a particular embodiment, the value of $M_1$ is 0.2. Other operating conditions are also possible.

In use and in a particular embodiment, at least some of the particles are separated from the flow by directing a first portion 76 of the flow including air and particles through the inlet duct 42 and into the bypass duct 46 without impacting the downstream wall portion 44d of the intermediate duct 44. The particles 76 continue through the bypass duct 46 and are ejected through the outlet 56. A second portion 78 of the flow including air is also directed through the inlet duct 42, but turns away from the first portion into the intermediate duct 44 to reach the inlet 12 of the engine. Because of the turn required to direct the flow into the intermediate duct 44, the particles having inertia too great to follow the turn continue into the bypass duct 46 and are accordingly separated from the air flowing to the inlet 12 of the engine.

Figure 3:
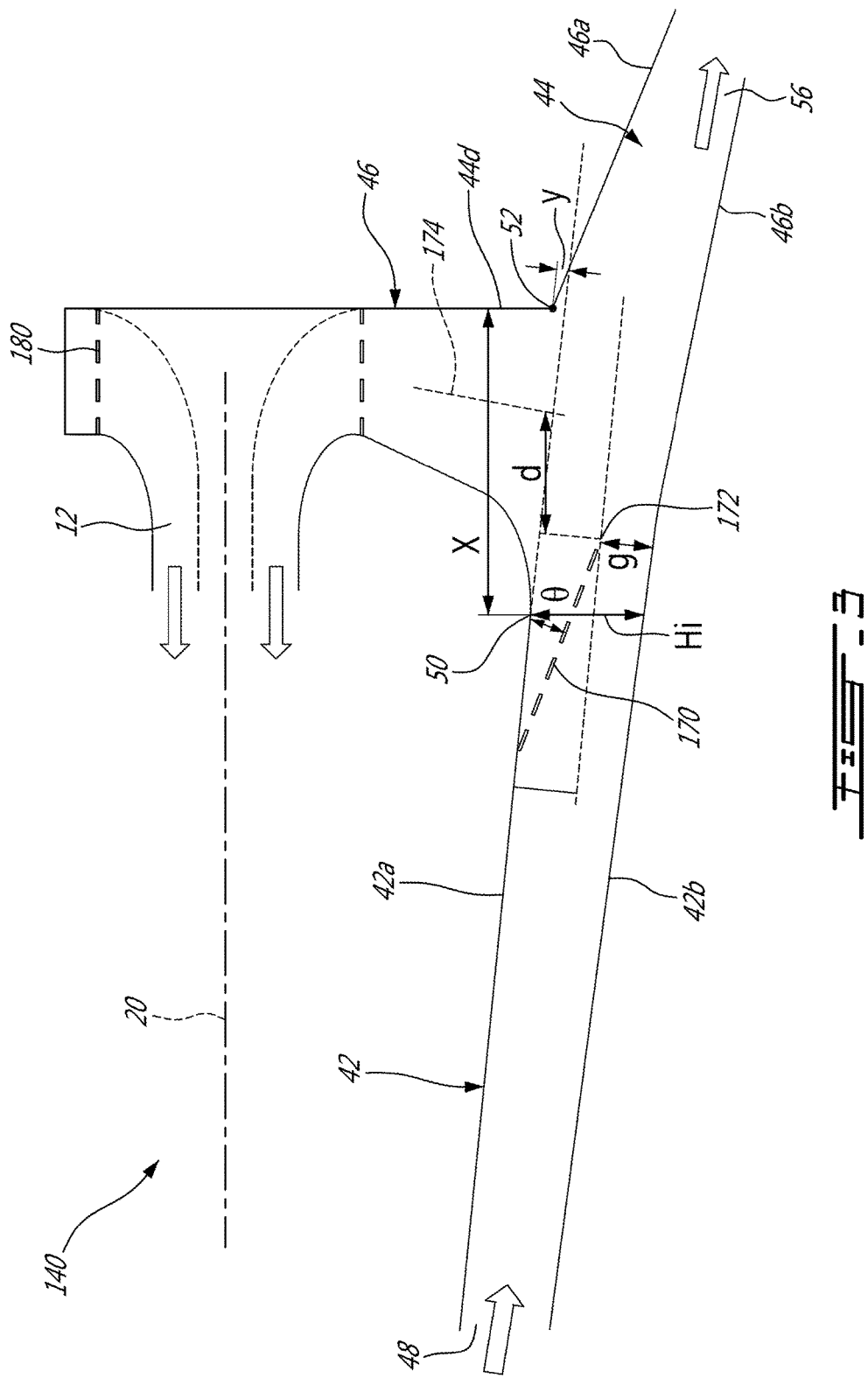
FIG. 3 is a schematic cross-sectional view of an inertial particle separator in accordance with another particular embodiment, which may be used with the gas turbine engine of FIG. 1.
Figure 4:
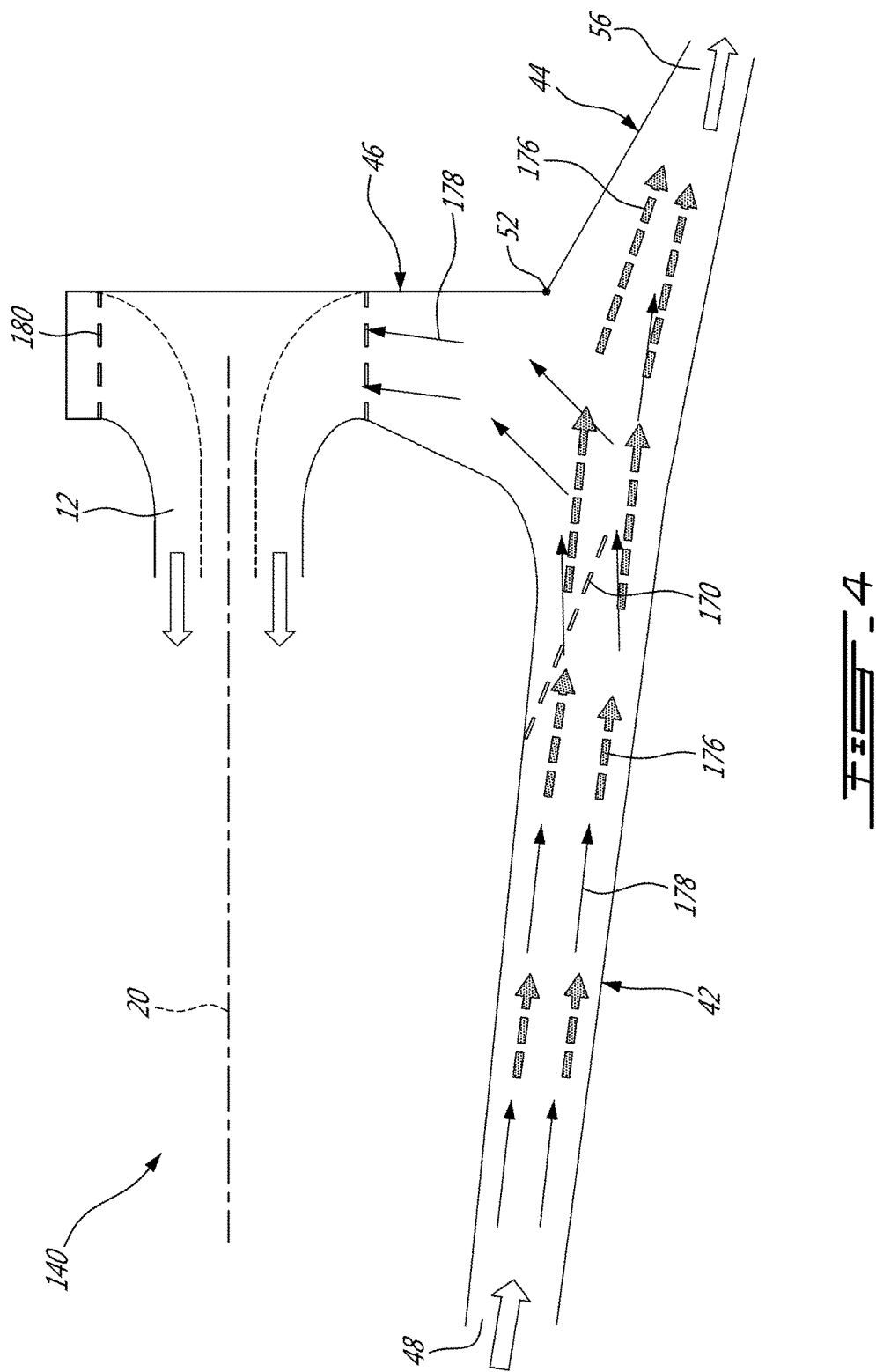
FIG. 4 is a schematic cross-sectional view of the inertial particle separator of FIG. 3 during non-icing conditions.

Referring to FIGS. 3-5, an inertial particle separator 140 in accordance with another particular embodiment is shown, where elements similar to those of the particle separator 40 of FIGS. 2a-2b are identified by the same reference numeral and will not be further described herein. The particle separator 140 of FIGS. 3-5 includes an angled vane 170 located in the inlet duct 42. The vane 170 extends non-perpendicularly from the engine side 42a of the wall of the inlet duct 42 and has an edge 172 spaced from the wall of the inlet duct 42. In a particular embodiment, the vane 170 has a fixed position within the inlet duct 42.

Referring particularly to FIG. 3, the vane 170 extends at an angle θ from the engine side 42a of the wall of the inlet duct 42, with the edge 172 being located downstream of the portion of the vane 170 adjacent the engine side 42a. The edge 172 is located at a radial distance g from the outer side 42b of the wall of the inlet duct 42, and at an axial distance d from a central axis 174 of the intermediate duct 44. The edge 172 is located radially outwardly of the intersection 52 between the walls of the intermediate duct 44 and of the bypass duct 46. In a particular embodiment, the angle θ has a value from 10° to 40°, the radial distance g (or gap) has a value from 15% to 40% of the height $H_i$ of the inlet duct 42, and the axial distance d has a value from 40% to 60% of the width X of the inlet of the intermediate duct 44. It is understood that other values are also possible, and that each of these values may be applicable independently of the others.

In the embodiment shown, the vane 170 is porous, with openings configured so as to allow most particles to flow therethrough in non-icing conditions. The vane 170 is configured so as to reduce, minimize or avoid deflection of the flow during non-icing conditions; for example, the porous vane 170 allows for lower flow distortions and a lower pressure loss than a similarly sized solid vane including louvers to let the flow therethrough. The openings of the porous vane 170 are however sized such that in icing conditions, the porous vane 170 allows to aggregate ice, i.e. the water droplets (e.g. super cooled water droplets) will form a coating of ice on the vane 170, blocking the openings and causing the vane 170 to act as a solid vane.

In a particular embodiment, the vane 170 includes or is constituted by a screen (e.g. mesh material), for example a screen defining opening having a cross-sectional dimension of about 1-2 millimetres. Other dimensions are also possible. Alternately, the porous vane 170 can be configured as a perforated plate, or be defined in part or in whole by open cell material such as honeycomb material. Other configurations are also possible.

The particle separator 140 may also include an engine screen 180 or other suitable porous wall between the intermediate duct 44 and the engine inlet 12, or within the intermediate duct 44, for further filtering of particles.

FIG. 4 shows the vane 170 under non-icing conditions. Larger particles or large debris 176 (e.g. rain, sand, birds) enter the intake 48 and flow through the inlet duct 42. These particles 176 are separated from the engine flow by the bend at the intermediate duct 44 and directed into the bypass duct 46 to be expelled through the outlet 56. The air flow, as well as the particles small enough, pass through the porous vane 170 with no or with minimal deflection. Part of the air flow 178 turns into the intermediate duct 44 and reaches the engine inlet 12.

In a particular embodiment, the intersection 52 between the walls of the bypass duct 46 and of the intermediate duct 44 is located radially inwardly of the prolongation of the engine side 42a of the wall of the inlet duct 42 by a distance y, as detailed above for the embodiment of FIGS. 2a-2b. In a particular embodiment, such a configuration provides for particle separation when the vane 170 defines no or minimal obstruction to the flow, i.e. in non-icing conditions.

FIG. 5 shows the vane 170 under icing conditions. Icing particle or other particles/debris enter the intake 48 and flow through the inlet duct 42. Ice has accreted on the vane 170 to block its openings; accordingly the vane 170 acts as a solid wall and blocks a portion of the inlet duct 42. The flow of particles 176 and of air 178 is accelerated through the area under the vane 170. The inertia of the particles 176 (e.g. icing particles) is increased as they are accelerated, separated from the engine flow, and directed into the bypass duct 46, unable to turn to reach the intermediate duct 44. Part of the air flow 178 turns into the intermediate duct 44 and reaches the engine inlet 12.

In use and in a particular embodiment, at least some of the particles are separated from the flow by directing a first portion of the flow including air and particles 176, and a second portion of the flow including air 178, through the inlet duct 42. Part of both portions 176, 178 of the flow goes through the porous vane 170 during non-icing conditions. During icing conditions, once the openings of the vane 170 are blocked by an iced coating, the portions 176, 178 of the flow are deflected by the vane 170 away from the intermediate duct 44. The increased turn required for the air 178 to reach the intermediate duct 44 provides separation from the heavier water droplets, which continue into the bypass duct 46 to be ejected through the outlet 56.

In a particular embodiment, the particle separator 40, 140 allows to protect a turboprop/turboshaft engine against foreign object ingestion including water, icing particles, and large debris. In a particular embodiment, the particle separator 40, 140 allows for particle separation to be performed with a relatively simple mechanical arrangement with minimal additional weight on the inlet assembly.

The use of a porous vane 170 (e.g. including/constituted by a screen) allows for the vane 170 to have a fixed position while minimizing its impact on the flow during non-icing conditions. In contrast to solid vanes that are actuated to be moved out of the flow during non-icing conditions to minimize their impact on the flow, the particle separator 140 with fixed porous vane 170 can provide for reduced pressure loss, complexity and/or weight.

Although the particle separator 40, 140 has been shown as configured for a forward facing intake of a reversed flow engine with a single intermediate duct, it is understood that various alternate configurations are possible, including for a through flow engine, a side facing intake, a bifurcated intermediate duct and/or a bifurcated inlet duct.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An aircraft engine having an inertial particle separator communicating with an engine inlet of the aircraft engine, the inertial particle separator comprising:
   an inlet duct defining an intake communicating with an environment of the engine;
   an intermediate duct extending generally transversally from the inlet duct to the engine inlet, the intermediate duct communicating with the inlet duct adjacent a downstream end of the inlet duct; and
   a bypass duct in fluid communication with and extending downstream from the inlet duct and intermediate duct, the bypass duct defining an outlet communicating with the environment of the engine;
   wherein a wall of the intermediate duct intersects a wall of the inlet duct on an engine side of the wall of the inlet duct, the engine side of the wall of the inlet duct defining an engine-side inlet air flow line of the inertial particle separator, a wall of the bypass duct intersecting the wall of the intermediate duct closer to a central axis of the aircraft engine than an extension of the engine-side inlet air flow line into the bypass duct while a central axis of the inlet duct extends from the inlet duct into the bypass duct before intersecting an engine side of the wall of the bypass duct.

2. The aircraft engine as defined in claim 1, wherein a height of the inlet duct is defined adjacent the intermediate duct, a height of the bypass duct is defined adjacent the intermediate duct, and the height of the bypass duct is greater than the height of the inlet duct.

3. The aircraft engine as defined in claim 1, wherein central axes of the inlet duct and of the bypass duct are straight.

4. The aircraft engine as defined in claim 1, wherein the wall of the intermediate duct has a curved portion extending from the wall of the inlet duct and a straight portion extending from the curved portion, the curved portion extending along an angle $\alpha t$, the curved portion defining a curved central axis for a transition between the inlet and intermediate ducts, the curved central axis having a mean radius Rm, wherein a radial distance y is defined between the intersection of the wall of the bypass duct with the wall of the intermediate duct and the extension of the engine-side inlet air flow line, and wherein $$\frac{y}{R_m} > A(\sin(\alpha_t) - 1),$$

where A is a constant greater than 0.

5. The aircraft engine as defined in claim 4, wherein A has a value within a range extending from 0.2 to 5.

6. The aircraft engine as defined in claim 1, wherein the inertial particle separator is configured for an engine operating condition defining an airflow with a Mach number $M_1$ at the downstream end of the inlet duct, wherein a width X of an inlet of the intermediate duct is defined along the engine-side inlet air flow line, wherein the inlet duct has a height $H_i$, and wherein $$\frac{M_1^{0.6}}{X} * H_i > B,$$

where B is a constant having a value within a range extending from 0.12 to 0.5.

7. The aircraft engine as defined in claim 1, further comprising an angled vane extending non-perpendicularly from the engine side of the inlet duct to an edge spaced from the wall of the inlet duct.

8. The inertial particle separator as defined in claim 7, wherein the angled vane has a fixed position and includes openings allowing particles to pass therethrough, the openings sized so as to aggregate ice and be blocked by an ice coating under icing conditions.

9. A gas turbine engine comprising:
  at least one rotatable shaft in driving engagement with a compressor section and with a turbine section and defining a central axis of the engine;
  an engine inlet in fluid communication with the compressor section;
  an inertial particle separator comprising:
    an inlet duct defining an intake and including a wall having opposed engine and outer sides, the engine side located between the central axis of the engine and the outer side;
    an intermediate duct extending radially inwardly from the inlet duct to the engine inlet, the intermediate duct communicating with the inlet duct adjacent a downstream end of the inlet duct, a wall of the intermediate duct intersecting the wall of the inlet duct on the engine side; and
    a bypass duct in fluid communication with and extending downstream from the inlet duct and intermediate duct to define an outlet;
    wherein in a plane containing central axes of the inlet duct and of the bypass duct, an imaginary straight line overlaps the engine side of the wall of the inlet duct and extends downstream from the inlet duct into the bypass duct; and
    wherein an intersection between a wall of the bypass duct and the wall of the intermediate duct is located radially inwardly of the imaginary straight line relative to the central axis of the engine while a central axis of the inlet duct extends from the inlet duct into the bypass duct before intersecting an engine side of the wall of the bypass duct.

10. The gas turbine engine as defined in claim 9, wherein a height of the inlet duct is defined adjacent the intermediate duct, a height of the bypass duct is defined adjacent the intermediate duct, and the height of the bypass duct is greater than the height of the inlet duct.

11. The gas turbine engine as defined in claim 9, wherein the central axes of the inlet duct and of the bypass duct are straight.

12. The gas turbine engine as defined in claim 9, wherein the wall of the intermediate duct has a curved portion extending from the wall of the inlet duct and a straight portion extending from the curved portion, the curved portion extending along an angle $\alpha_t$, the curved portion defining a curved central axis for a transition between the inlet and intermediate ducts, the curved central axis having a mean radius $R_m$, wherein a radial distance y is defined between the intersection of the wall of the bypass duct with the wall of the intermediate duct and the imaginary straight line, and wherein $$\frac{y}{R_m} > A(\sin(\alpha_t) - 1),$$

where A is a constant greater than 0.

13. The gas turbine engine as defined in claim 12, wherein A has a value within a range extending from 0.2 to 5.

14. The gas turbine engine as defined in claim 9, wherein the inertial particle separator is configured for an engine operating condition defining an airflow with a Mach number $M_1$ at the downstream end of the inlet duct, wherein a width X of an inlet of the intermediate duct is defined along the engine-side inlet air flow line, wherein the inlet duct has a height $H_i$, and wherein $$\frac{M_1^{0.6}}{X} * H_i > B,$$

where B is a constant having a value within a range extending from 0.12 to 0.5.

15. The gas turbine engine as defined in claim 9, further comprising an angled vane extending non-perpendicularly from the engine side of the wall of the inlet duct to an edge spaced from the wall of the inlet duct.

16. The inertial particle separator as defined in claim 15, wherein the angled vane has a fixed position and includes openings allowing particles to pass therethrough, the openings sized so as to aggregate ice and be blocked by an ice coating under icing conditions.

17. A method of separating particles from a flow for an inlet of an engine, the method comprising:
  directing a first portion of the flow including air and particles through an inlet duct and into a bypass duct away from the inlet of the engine without impacting a wall of an intermediate duct, the intermediate duct extending generally transversally from the inlet duct to the inlet of the engine, an intersection between the wall of the intermediate duct and a wall of the bypass duct located closer to a central axis of the engine than an intersection between the wall of the intermediate duct and a wall of the inlet duct while a central axis of the inlet duct extends from the inlet duct into the bypass duct before intersecting an engine side of the wall of the bypass duct; and
  directing a second portion of the flow including air through the inlet duct and turning the second portion of the flow away from the first portion and into the intermediate duct to flow the second portion to the inlet of the engine.

18. The method as defined in claim 17, further comprising:
  during non-icing conditions, flowing the first and second portions of the flow at least in part through openings of a vane extending within the inlet duct; and
  during icing conditions, upon blocking of the openings of the vane by an ice coating, deflecting the first and second portions of the flow within the inlet duct away from the intermediate duct with the vane.

* * * * *